United States Patent
Du Pontavice et al.

(10) Patent No.: US 11,524,760 B2
(45) Date of Patent: Dec. 13, 2022

(54) VARIABLE-LIFT ABILITY DEVICE COMPRISING AN ANTI-STRATIFICATION DIFFUSER

(71) Applicant: THALES, Courbevoie (FR)

(72) Inventors: Emmanuel Du Pontavice, Cannes la Bocca (FR); Martin Raynaud, Cannes la Bocca (FR); Jean-Baptiste Billard, Cannes la Bocca (FR)

(73) Assignee: THALES, Courbevoie (FR)

( * ) Notice: Subject to any disclaimer, the term of this patent is extended or adjusted under 35 U.S.C. 154(b) by 87 days.

(21) Appl. No.: 17/173,078

(22) Filed: Feb. 10, 2021

(65) Prior Publication Data

US 2021/0253217 A1    Aug. 19, 2021

(30) Foreign Application Priority Data

Feb. 13, 2020 (FR) ........................................ 2001399

(51) Int. Cl.
*B64B 1/62* (2006.01)
(52) U.S. Cl.
CPC ..................................... *B64B 1/62* (2013.01)
(58) Field of Classification Search
CPC ....................................................... B64B 1/62
See application file for complete search history.

(56) References Cited

U.S. PATENT DOCUMENTS

| 1,475,210 | A | * | 11/1923 | Upson | ...................... | B64B 1/00 |
| | | | | | | 244/97 |
| 3,063,657 | A | * | 11/1962 | Coester | .................... | B64B 1/62 |
| | | | | | | 244/31 |
| 5,333,817 | A | * | 8/1994 | Kalisz | ...................... | B64B 1/60 |
| | | | | | | 244/128 |
| 5,538,203 | A | * | 7/1996 | Mellady | ................... | B64B 1/60 |
| | | | | | | 244/128 |

FOREIGN PATENT DOCUMENTS

| CN | 108 298 058 A | 7/2018 | |
| CN | 108298058 A * | 7/2018 | ............... B64B 1/58 |
| WO | 95/14607 A1 | 6/1995 | |

OTHER PUBLICATIONS

English Translation of Description in CN108298058A—Danyang Haotian Aircraft Tech Co Ltd—Publication Date Jul. 20, 2018 (machine translation generated at espacenet.com on Oct. 5, 2022).

* cited by examiner

*Primary Examiner* — Tye William Abell
(74) *Attorney, Agent, or Firm* — BakerHostetler

(57) ABSTRACT

A variable-liftability device includes a pressurized hermetically sealed chamber accepting a gas of density lower than the density of the air; a mixer arranged at least partially inside the hermetically sealed chamber and configured to introduce air into the hermetically sealed chamber.

8 Claims, 6 Drawing Sheets

VARIABLE-LIFT ABILITY DEVICE COMPRISING AN ANTI-STRATIFICATION DIFFUSER

CROSS-REFERENCE TO RELATED APPLICATIONS

This application claims priority to foreign French patent application No. FR 2001399, filed on Feb. 13, 2020, the disclosure of which is incorporated by reference in its entirety.

FIELD OF THE INVENTION

The present invention relates to the field of variable-liftability devices employing a gas lighter than air in order to rise up through the atmosphere. More specifically, the invention relates to the variable-liftability devices equipped with a single reservoir for storing, under pressure, the lighter-than-air gas such as helium, neon, methane, ethane and hydrogen.

BACKGROUND

A variable-liftability device can be interpreted as being a stratospheric dirigible platform with a pressurized flexible envelope, known by the name of "Blimp".

Traditionally, variable-liftability devices are provided with several completely hermetically sealed balloons containing the gas that is lighter than air. It is these balloons filled with the gas that is lighter than air that provide the variable-liftability devices with lift. These balloons are contained inside a flexible structure forming the envelope of the variable-liftability devices. The rest of the volume of the envelope is occupied by air. In order to ascend, air is ejected and in order to descend, air is injected. The multiplicity of the air balloons ensures the longitudinal static stability whatever the level of filling with air.

This model is particularly favoured for variable-liftability devices operating in the troposphere, where the air density is high. However, in the case of variable-liftability devices operating in the stratosphere, namely variable-liftability devices the cruising altitude of which is above the tropopause, the density of the air is very much lower than the density of the air in the troposphere. The mass of the variable-liftability stratospheric devices therefore needs to be reduced in order to allow the variable-liftability devices to ascend as high as these altitudes.

Now, the multiplicity of the structures (the envelope and the balloons) have a tendency to greatly increase the mass of the variable-liftability device.

The use of a single hermetically sealed reservoir would make it possible to avoid the use of several balloons and would greatly reduce the on-board mass.

According to the prior art described hereinabove, because the gas that is lighter than air is contained in the balloons, it is never in direct contact with the air injected into the envelope of the variable-liftability device.

A solution involving injecting air directly into a single reservoir is not viable: the resulting heterogeneous mixing between the gas that is lighter than air and the air may lead to instability in terms of the pitch attitude of the variable-liftability device, namely to an excessive angular difference between the horizontal plane and the longitudinal axis of the stratospheric variable-liftability device. This instability may increase so far as to completely incline the stratospheric variable-liftability device until it adopts a vertical attitude.

This is because since the gas that is lighter than air has a density lower than the density of the air, the gas that is lighter than air would naturally position itself in the upper part of the reservoir, leaving the air in the lower part of the reservoir of the stratospheric variable-liftability device. In other words, in the case of a single balloon, injecting air causes air to migrate towards the bottom of the reservoir and generates this instability in pitch attitude. The phenomenon is the same if the air is injected around the balloons and does not mix well. The air which, as stated previously, is more dense than the gas that is lighter than air, migrates towards the bottom of the envelope. Because the disposition along the longitudinal axis of the stratospheric variable-liftability device is not homogeneous, instability in pitch angle arises.

During the phases of varying the lift, such as in descent phases, it is therefore necessary to obtain a homogeneous mixture inside a potential single reservoir in order to ensure that such a stratospheric variable-liftability device can be controlled.

SUMMARY OF THE INVENTION

The invention seeks to overcome all or some of the abovementioned problems by proposing a variable-liftability device comprising a mixer capable of ensuring homogeneous mixing between the air and a gas lighter than air within a single pressurized hermetically sealed chamber.

To this end, the invention relates to a variable-liftability device, characterized in that it comprises:
- a pressurized hermetically sealed chamber accepting a gas of density lower than the density of the air;
- a mixer arranged at least partially inside the hermetically sealed chamber and configured to introduce air into the hermetically sealed chamber.

According to one aspect of the invention, the mixer comprises a sleeve provided with at least one perforation and at least one injector for injecting air into the sleeve.

According to one aspect of the invention, the sleeve is obtained from a porous fabric.

According to one aspect of the invention, the variable-liftability device extends along a longitudinal first axis and the sleeve has the form of a tube extending substantially along the longitudinal first axis of the variable-liftability device.

According to one aspect of the invention, the sleeve extends along a second axis secant with the longitudinal first axis of the variable-liftability device.

According to one aspect of the invention, at least one injector is positioned along the sleeve of the mixer along the longitudinal first axis of the variable-liftability device.

According to one aspect of the invention, at least one injector is positioned at one end of the sleeve of the mixer.

According to one aspect of the invention, a cross section of the sleeve of the mixer substantially perpendicular to the longitudinal first axis is defined by a characteristic dimension greater than 15 centimetres.

According to one aspect of the invention, the cross section of the sleeve of the mixer substantially perpendicular to the longitudinal first axis is defined by a characteristic dimension smaller than 250 centimetres.

BRIEF DESCRIPTION OF THE DRAWINGS

The invention will be better understood and further advantages will become apparent on reading the detailed description of one embodiment given by way of example, the description being illustrated by the attached drawing, in which.

For the sake of clarity, in the various figures, the same elements bear the same reference numerals.

DETAILED DESCRIPTION

Figure 1A:
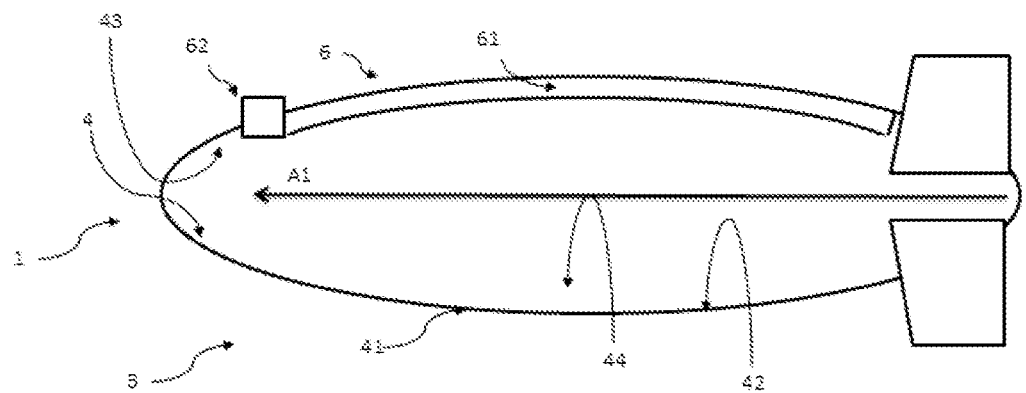
FIG. 1a depicts a schematic side view, seen in cross section, of the variable-liftability device according to the invention.
Figure 1B:
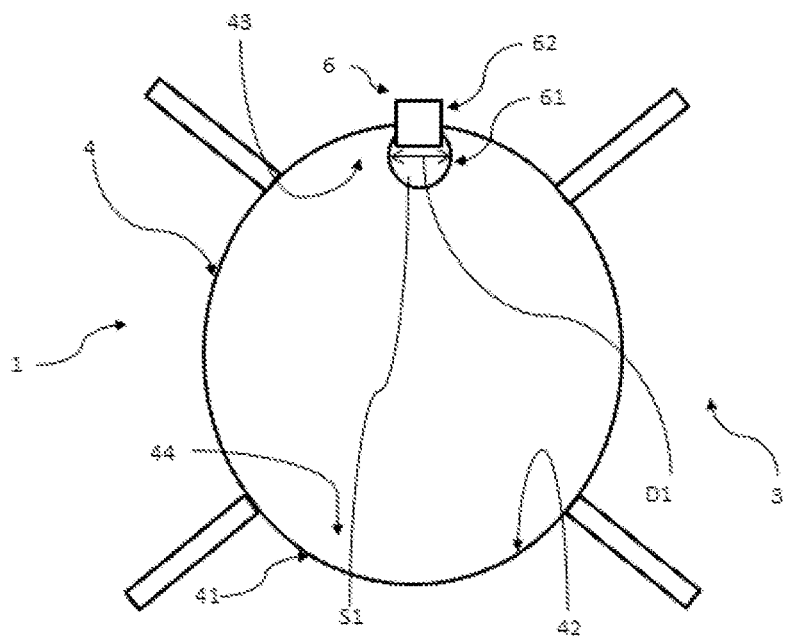
FIG. 1b depicts a schematic front view, seen in cross section, of the variable-liftability device according to the invention.

FIG. 1a depicts a schematic side view, seen in cross section, of a variable-liftability device 1. The view in cross section in FIG. 1a is a section on a vertical plane containing a longitudinal axis A1 of the variable-liftability device 1. FIG. 1b depicts a schematic front view, seen in cross section, of the variable-liftability device 1. The view in cross section of FIG. 1b is a section on a vertical plane perpendicular to the longitudinal axis A1 of the variable-liftability device 1. The variable-liftability device 1 comprises a pressurized hermetically sealed chamber 4 intended to accept a gas of density lower than the density of the air. This hermetically sealed chamber 4 may, from an external viewpoint, correspond to the envelope of the variable-liftability device 1. The hermetically sealed chamber 4 is therefore in contact, along an external face 41, with external surroundings 3 and, along an internal face 42, with the gas of a density lower than the density of the air. The hermetically sealed chamber 4 provides sealing between the external surroundings 3 and the gas contained in the hermetically sealed chamber 4. However, the invention also applies with an additional balloon containing the gas that is lighter than air which provides the sealing. In that case, the additional balloon acts as the hermetically sealed chamber 4.

The variable-liftability device 1 also comprises a mixer 6, arranged partially inside the hermetically sealed chamber 4 and capable of introducing air into the hermetically sealed chamber 4 and of mixing this air with the gas of density lower than the density of the air inside the hermetically sealed chamber 4. Specifically, the mixer 6 comprises a sleeve 61 arranged inside the hermetically sealed chamber 4 and an injector 62 connected on the one hand to the sleeve 61 and on the other hand to the external surroundings 3. In this way, the injector 62 is able to inject air from the external surroundings 3 into the sleeve 61.

The mixer 6 is positioned against an upper part 43 of the internal face 42 of the hermetically sealed chamber 4. More specifically, the sleeve 61 of the mixer 6 is positioned against the upper part 43 of the hermetically sealed chamber 4 and the injector 62 passes through the upper part 43 of the hermetically sealed chamber 4 in order to be able to communicate with the air of the external surroundings 3. More generally, the invention applies with an injector 62 connected to the sleeve 61, whatever its positioning on the sleeve 61.

In this way, the injector 62 allows air from the external surroundings 3 to be injected into the sleeve 61. Thus, air passes through the sleeve 61 homogeneously and diffuses into the hermetically sealed chamber 4.

The sleeve 61 of the mixer 6 advantageously takes the form of a tube and extends substantially along the longitudinal axis A1 which is defined as being the axis passing horizontally across the variable-liftability device 1. Thus, the sleeve 61 may adopt any tube shape such as, for example and nonlimitingly, the shape of a tube with a square cross section or a tube with a circular cross section. Advantageously, the sleeve 61 is flexible and naturally adopts the shape of a cylindrical tube. According to the invention, the sleeve 61 may adopt any other shape that occupies a portion of the volume in the hermetically sealed chamber 4.

The sleeve 61 can be obtained from a rigid material, such as from polyvinyl chloride or another rigid plastics material. Advantageously, the sleeve 61 is obtained from a flexible material such as a fabric. This thus reduces the mass of the sleeve 61.

Furthermore, the sleeve 61 may be defined by a sleeve section S1 which is the cross section of the tube. This section may be a square section in the case of a sleeve 61 made as a square-section tube, or may be a circular cross section in the case of a cylindrical sleeve 61. The sleeve section S1 is defined by a characteristic dimension D1. For a square section of sleeve S1, the characteristic dimension D1 may be a right cross section, and for a circular sleeve section S1, the characteristic dimension D1 may be the diameter. Advantageously, the characteristic dimension D1 is the diameter of the circular sleeve section S1. The characteristic dimension D1 is a length dependent on the dimensions of the variable-liftability device 1. Nevertheless, the characteristic dimension D1 may be defined as a length of between 15 centimetres and 250 centimetres. Ideally, the characteristic dimension D1 is a length of 100 centimetres.

Figure 2A:
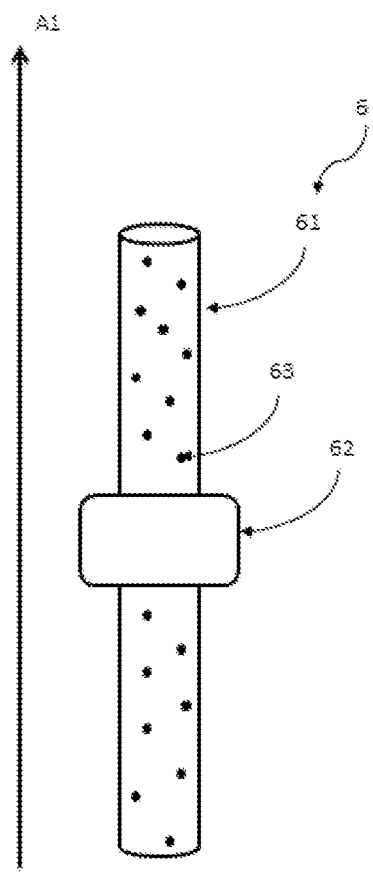
FIG. 2a depicts a schematic view of the mixer of the variable-liftability device according to a first embodiment.
Figure 2B:
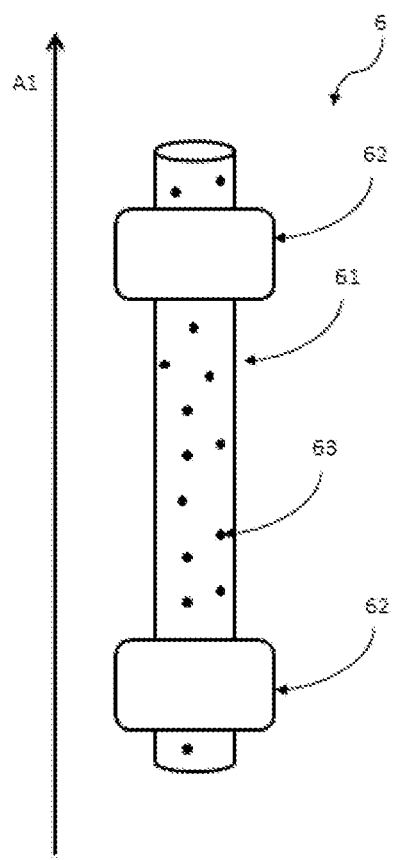
FIG. 2b depicts a variant of the first embodiment of the mixer of the variable-liftability device.

In addition, as shown by FIGS. 2a and 2b which depict the sleeve 61 accompanied by an injector 62 in the case of FIG. 2a, and by two injectors in the case of FIG. 2b, the sleeve 61 is pierced in its entirety with multiple perforations 63. This is one application example. The invention also covers instances in which the sleeve 61 is partially pierced, namely pierced with at minimum one perforation 63, and advantageously with a plurality of perforations 63.

The perforations 63 of the sleeve 61 allow direct exchange between the air injected by the injector 62 and the gas of density lower than the density of the air. Thus, convective exchanges may take place between the air of the external surroundings 3 which is injected by the injector 62 and the gas with a density lower than the density of the air. Specifically, the air injected into the sleeve 61 using the injector 62 creates an overpressure inside the sleeve 61. The surplus air contained within the sleeve 61 is therefore removed via the perforations 63. Because the density of the injected air is greater than that of the gas with a density lower than the density of the air, the injected air naturally migrates towards a lower part 44 of the hermetically sealed chamber 4, thereby creating a convection cell that encourages mixing in the hermetically sealed chamber 4.

Advantageously, the fabric from which the sleeve 61 originates is porous. Specifically, the porosity is defined as all of the voids contained in a solid material. Now, a void in a solid material can be interpreted as being a perforation. A porous fabric is therefore a fabric provided with multiple perforations 63. Thus, by way of example, the sleeve 61 is obtained from a porous fabric so as to improve as far as possible the passage of the air injected by the injector 62 from the sleeve 61 towards the hermetically sealed chamber 4. The multiple perforations 63, obtained either by way of perforations per se or by way of the porosity of the sleeve, allow an increase in the area of contact between the injected air and the gas present in the hermetically sealed chamber 4. Specifically, the mixing zone can be likened to an isosceles triangle with, as its principal vertex, the air injection zone. The contact surface is then made up of the sides of the triangle thus formed. The surface area of the region of mixing between the two gases which is increased in this way contributes to the good mixing of the air into the gas of the hermetically sealed chamber 4.

The mixer 6 may comprise, according to a first embodiment as depicted in FIG. 2a, a single injector 62 positioned along the sleeve 61.

Moreover, the mixer 6 may comprise two injectors 62, as depicted in FIG. 2b, positioned along the sleeve 61. The invention is also applicable to instances in which the mixer 6 comprises more than two injectors 62.

Figure 3A:
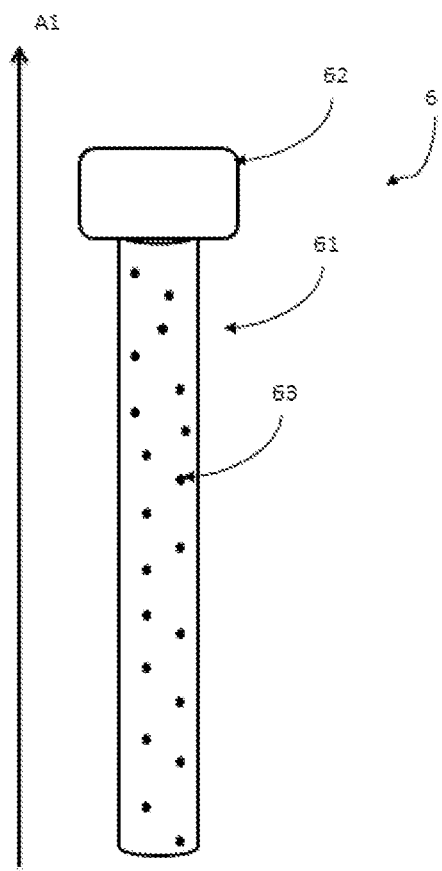
FIG. 3a depicts a schematic view of the mixer of the variable-liftability device according to a second embodiment.

As a preference, as depicted in FIG. 3a, the injector 62 is positioned, according to a second embodiment, at one end of the sleeve 61 of the mixer 6 along the longitudinal axis A1.

Figure 3B:
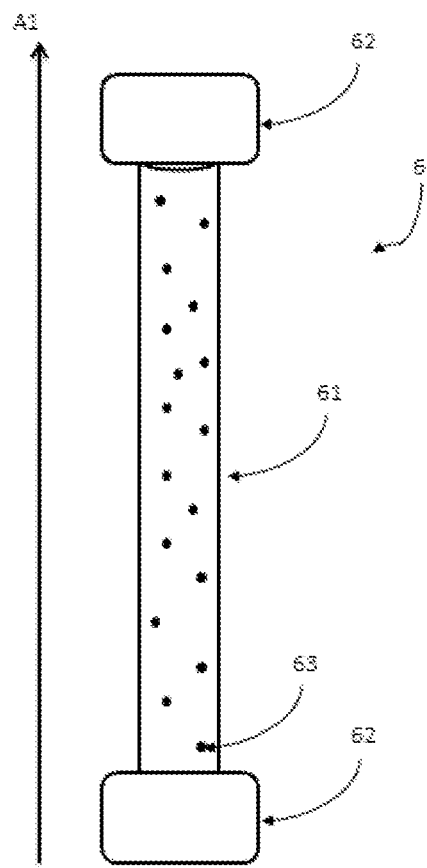
FIG. 3b depicts a variant of the second embodiment of the mixer of the variable-liftability device.

Likewise, two injectors 62 may be positioned at different ends of the sleeve 61 of the mixer 6 along the longitudinal axis A1, as depicted in FIG. 3b. The mixer 6 may comprise more than two injectors 62 so long as the mass added by the number of injectors 62 does not penalize the lift and the overall weight of the variable-liftability device 1.

Figure 4:
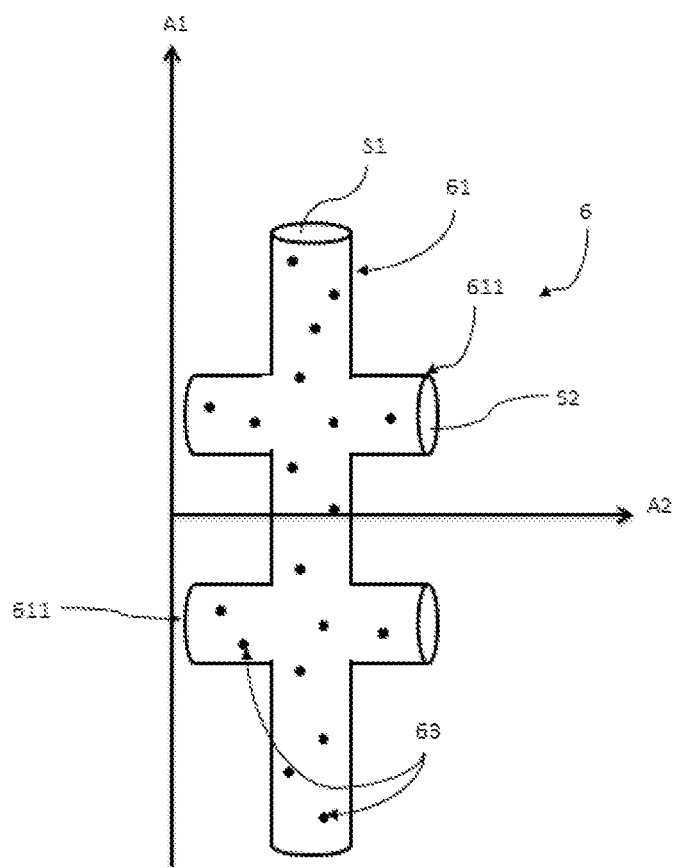
FIG. 4 depicts a schematic view of the mixer of the variable-liftability device according to a third embodiment.

Finally, a third embodiment, depicted in FIG. 4, may be envisioned. The sleeve 61 of the mixer 6 which extends along the longitudinal axis A1, may comprise a secondary part 611 of the sleeve 61. The secondary part 611 of the sleeve 61 adopts the tubular shape of the sleeve 61 and extends along a second axis A2 secant with the longitudinal axis A1 of the variable-liftability device 1. In one preferred embodiment, the second axis A2 is orthogonal to the longitudinal axis A1. The secondary part 611 of the sleeve 61 comprises, like the sleeve 61, at least one and preferably a plurality of perforations 63.

Furthermore, the secondary part 611 of the sleeve 61 is defined by a secondary section S2. The secondary section S2 is preferably identical to the sleeve section S1. However, the secondary section S2 of the secondary part 611 of the sleeve 61 may differ from the sleeve section S1.

This embodiment depicted in FIG. 4 allows an increase in the potential surface area for exchange between the air injected through the perforations 63 of the sleeve 61 and of the secondary part 611 and the gas with a density lower than the density of the air. In this way, the homogenizing of the mixture is improved.

The invention relies on the injection of a so-called heavy gas onto a so-called light gas contained in the hermetically sealed chamber 4. This injection (namely the injection of air into the hermetically sealed chamber 4) is advantageously performed over a large surface area, along the sleeve 61 of the mixer 6, so as to obtain optimum mixing between the two gases. This results in the formation of convection cells which are able to improve the mixing of the gases and the heat transfer with the external surroundings 3. Thus, the invention benefits from an injection of air into the sleeve 61 and from the mixing of the gases in the hermetically sealed chamber 4 to offer good controllability of the variable-liftability device 1 as it descends.

The invention claimed is:

1. A variable-liftability device, comprising:
   a pressurized hermetically sealed chamber containing a gas of density lower than a density of air in external surroundings to the chamber;
   a mixer arranged at least partially inside the hermetically sealed chamber and configured to introduce air from the external surroundings into the hermetically sealed chamber, the mixer comprising a sleeve arranged inside the hermetically sealed chamber, the sleeve provided with at least one perforation,
   and at least one injector, connected to the external surroundings, for injecting air from the external surroundings into the sleeve, said at least one perforation in the sleeve allowing for direct exchange between air from the external surroundings injected by the injector and the gas of density lower than the density of said air in the chamber, to enable convective exchanges inside the chamber between the air from the external surroundings and said gas of density lower than the density of said air.

2. The variable-liftability device according to claim 1, wherein the sleeve is obtained from a porous fabric.

3. The variable-liftability device according to claim 1, wherein the at least one injector is positioned along the sleeve of the mixer along the longitudinal first axis (A1) of the variable-liftability device.

4. The variable-liftability device according to claim 3, wherein the at least one injector is positioned at one end of the sleeve of the mixer.

5. The variable-liftability device according to claim 1, extending along a longitudinal first axis (A1), wherein the sleeve has the form of a tube extending substantially along the longitudinal first axis (A1) of the variable-liftability device.

6. The variable-liftability device according to claim 5, wherein the sleeve extends along a second axis (A2) secant with the longitudinal first axis (A1) of the variable-liftability device.

7. The variable-liftability device according to claim 5, wherein a cross section of the sleeve (S1) of the mixer substantially perpendicular to the longitudinal first axis (A1) is defined by a characteristic dimension (D1) greater than 15 centimeters.

8. The variable-liftability device according to claim 5, wherein the cross section of the sleeve (S1) of the mixer substantially perpendicular to the longitudinal first axis (A1) is defined by a characteristic dimension (D1) smaller than 250 centimeters.

* * * * *

UNITED STATES PATENT AND TRADEMARK OFFICE
CERTIFICATE OF CORRECTION

| | | |
|---|---|---|
| PATENT NO. | : 11,524,760 B2 | Page 1 of 1 |
| APPLICATION NO. | : 17/173078 | |
| DATED | : December 13, 2022 | |
| INVENTOR(S) | : Emmanuel Du Pontavice et al. | |

It is certified that error appears in the above-identified patent and that said Letters Patent is hereby corrected as shown below:

On the Title Page

Item (54) and in the Specification, Column 1, Lines 1-3, should read:
VARIABLE-LIFTABILITY DEVICE COMPRISING AN ANTI-STRATIFICATION DIFFUSER Signed and Sealed this
Third Day of September, 2024

Katherine Kelly Vidal
*Director of the United States Patent and Trademark Office*